US012366213B1

(12) United States Patent
Nagesh Dindgur

(10) Patent No.: US 12,366,213 B1
(45) Date of Patent: Jul. 22, 2025

(54) FUEL MANAGEMENT FOR DYNAMIC GAS BLENDING DISABLEMENT

(71) Applicant: Caterpillar Inc., Peoria, IL (US)

(72) Inventor: Manuj Nagesh Dindgur, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/638,406

(22) Filed: Apr. 17, 2024

(51) Int. Cl.
*F02D 19/08* (2006.01)
*F02D 19/06* (2006.01)
*F02D 41/00* (2006.01)

(52) U.S. Cl.
CPC ......... *F02D 19/081* (2013.01); *F02D 19/061* (2013.01); *F02D 19/0642* (2013.01); *F02D 19/0689* (2013.01); *F02D 41/0025* (2013.01)

(58) Field of Classification Search
CPC .. F02D 19/081; F02D 19/061; F02D 19/0642; F02D 19/0689; F02D 41/0025
See application file for complete search history.

(56) References Cited

U.S. PATENT DOCUMENTS

| | | | |
|---|---|---|---|
| 5,598,825 A | 2/1997 | Neumann | |
| 5,622,053 A | 4/1997 | Freen | |
| 7,222,015 B2 | 5/2007 | Davis et al. | |
| 9,752,515 B1 | 9/2017 | Stroup | |
| 9,828,954 B2 | 11/2017 | Majors et al. | |
| 2005/0161017 A1* | 7/2005 | Warlick | F02D 19/10 123/275 |
| 2007/0000456 A1* | 1/2007 | Wong | F02D 19/105 123/27 GE |
| 2008/0103676 A1* | 5/2008 | Ancimer | F02M 21/0245 701/103 |
| 2023/0415791 A1* | 12/2023 | Pedder | B60W 10/06 |

FOREIGN PATENT DOCUMENTS

| | | |
|---|---|---|
| CN | 108167102 | 6/2018 |

* cited by examiner

*Primary Examiner* — Kevin A Lathers
(74) *Attorney, Agent, or Firm* — Lee & Hayes, P.C.

(57) ABSTRACT

A system and method for adjusting primary fuel, when blending of primary fuel and secondary fuel is disabled, is provided. The method includes disabling, at a blend disabling angle, blending of primary fuel and secondary fuel for the DGB; determining whether the secondary fuel has been injected for a current cycle for a cylinder prior to the blend disabling angle; in response to determining that the secondary fuel has been injected for the current cycle prior to the blend disabling angle, injecting a pilot shot of the primary fuel for the current cycle; and in response to determining that the secondary fuel has not been injected for the current cycle prior to the blend disabling angle, injecting a full shot of the primary fuel for the current cycle.

17 Claims, 6 Drawing Sheets

FUEL MANAGEMENT FOR DYNAMIC GAS BLENDING DISABLEMENT

TECHNICAL FIELD

The present disclosure relates generally to dynamic gas blending for dual fuel engines, and more particularly, to fuel management when disabling the dynamic gas blending.

BACKGROUND

Some internal combustion engines, known as dual fuel engines, are configured to run on two different fuels. For example, such engines may operate on a mixture of diesel fuel and natural gas where diesel fuel is supplied through a diesel fuel supply system and natural gas is supplied through a natural gas supply system, where a ratio of diesel fuel to natural gas mixture may vary. In a port injected dual fuel system, such as a dynamic gas blending (DGB) system, diesel injectors of the diesel fuel supply system, which inject diesel fuel directly into a combustion chamber, have a shorter reload angle than corresponding gas admission valves of the natural gas supply system, which inject natural gas into an intake port. In other words, when the fuel mixture change is initiated, for example, disabling blending and operating on diesel fuel alone, the diesel fuel supply system is able to react to the fuel mixture change faster than the gas admission valves of the natural gas supply system. If the DGB is disabled and the diesel injectors are switched to fueling full diesel shots, some cylinders, having already loaded with natural gas outside the intake valves, may be over-fueled. If the DGB is disabled and the diesel injectors are delayed switching to fueling full diesel shots, some cylinders may then be under-fueled.

One example of adjusting blending of fuel mixture is disclosed in U.S. Pat. No. 9,752,515, issued to Stroup on Sep. 5, 2017 ("the '515 patent"). In particular, the '515 patent describes determining a maximum amount of secondary fuel that can be injected into a cylinder during a cycle based upon the rotational speed (RPM) of the engine and an amount of heat energy provided by primary fuel in the previous cycle to meet a desired heat energy to be produced in the next cycle. Secondary fuel is then injected into the intake port of the cylinder after the exhaust valve closes in an amount that is calculated based upon the maximum that can be injected.

Although useful in calculating a desired amount of secondary fuel for the next cycle to supplement primary fuel for producing desired heat energy, the device of the '515 patent may be limited. In particular, the '515 patent describes limited situations regarding providing secondary fuel for a next cycle based on a previous injection of primary fuel.

The systems and methods described herein are directed to addressing one or more of the drawbacks set forth above.

SUMMARY

According to a first aspect, a method in a dynamic gas blending (DGB) system for adjusting primary fuel, when blending of primary fuel and secondary fuel is disabled, is provided. The method includes disabling, at a blend disabling angle, blending of primary fuel and secondary fuel for the DGB; determining whether the secondary fuel has been injected for a current cycle for a cylinder prior to the blend disabling angle; in response to determining that the secondary fuel has been injected for the current cycle prior to the blend disabling angle, injecting a pilot shot of the primary fuel for the current cycle; and in response to determining that the secondary fuel has not been injected for the current cycle prior to the blend disabling angle, injecting a full shot of the primary fuel for the current cycle. Disabling the blending of the primary fuel and the secondary fuel includes disabling injection of the secondary fuel and disabling the blending of the primary fuel and the secondary fuel in response to detecting a command for disabling the blending. Where the cylinder is a first cylinder of a plurality of cylinders of an engine having a firing order, the method additionally includes, for each cylinder of the plurality of cylinders, determining whether the secondary fuel has been injected for a respective current cycle prior to the blend disabling angle; in response to determining that the secondary fuel has been injected for the respective current cycle prior to the blend disabling angle, injecting the pilot shot of the primary fuel for the respective current cycle; and in response to determining that the secondary fuel has not been injected for the respective current cycle prior to the blend disabling angle, injecting a full shot of the primary fuel for the respective current cycle.

According to another aspect, a dynamic gas blending (DGB) system for adjusting primary fuel, when blending of primary fuel and secondary fuel is disabled, is provided. The DGB includes an electronic control module (ECM); a primary fuel delivery system coupled to the ECM and a cylinder, the primary fuel delivery system configured to deliver primary fuel; and a secondary fuel delivery system coupled to the ECM and the cylinder, the secondary fuel delivery system configured to secondary primary fuel, wherein the ECM comprises: a processor; and a memory communicatively coupled to the processor, the memory storing thereon processor-executable instructions that, when executed by the processor, cause the processor to: disable, at a blend disabling angle, blending of the primary fuel and the secondary fuel for the DGB; determine whether the secondary fuel has been injected for a current cycle for the cylinder prior to the blend disabling angle; inject a pilot shot of the primary fuel for the current cycle in response to determining that the secondary fuel has been injected for the current cycle prior to the blend disabling angle, and inject a full shot of the primary fuel for the current cycle in response to determining that the secondary fuel has not been injected for the current cycle prior to the blend disabling angle. The processor-executable instructions further cause the processor to disable injection of the secondary fuel to disable the blending of the primary fuel and the secondary fuel and disable the blending in response to detecting a command for disabling the blending. For an engine with a plurality of cylinders having a firing order, the processor-executable instructions further cause the processor to, based at least in part of the firing order: determine whether the secondary fuel has been injected for a respective current cycle prior to the blend disabling angle; inject the pilot shot of the primary fuel for the respective current cycle in response to determining that the secondary fuel has been injected for the respective current cycle prior to the blend disabling angle; and inject a full shot of the primary fuel for the respective current cycle in response to determining that the secondary fuel has not been injected for the respective current cycle prior to the blend disabling angle.

According to yet another aspect, non-transitory computer-readable medium is provided that stores thereon processor-executable instructions that, when executed by a processor of a dynamic gas blending (DGB) system, cause the processor to perform certain operations for adjusting primary fuel when blending of primary fuel and secondary fuel is disabled. The operations include disabling, at a blend disabling angle, blending of primary fuel and secondary fuel for the DGB system; determining whether the secondary fuel has been injected for a current cycle for a cylinder prior to the blend disabling angle; in response to determining that the secondary fuel has been injected for the current cycle prior to the blend disabling angle, injecting a pilot shot of the primary fuel for the current cycle; and in response to determining that the secondary fuel has not been injected for the current cycle prior to the blend disabling angle, injecting a full shot of the primary fuel for the current cycle. Disabling the blending of the primary fuel and the secondary fuel includes disabling injection of the secondary fuel and disabling the blending of the primary fuel and the secondary fuel in response to detecting a command for disabling the blending. For an engine with a plurality of cylinders having a firing order, the operations additionally include, based at least in part of the firing order: determining whether the secondary fuel has been injected for a respective current cycle prior to the blend disabling angle; injecting the pilot shot of the primary fuel for the respective current cycle in response to determining that the secondary fuel has been injected for the respective current cycle prior to the blend disabling angle; and injecting a full shot of the primary fuel for the respective current cycle in response to determining that the secondary fuel has not been injected for the respective current cycle prior to the blend disabling angle.

According to yet another aspect, non-transitory computer-readable medium is provided that stores thereon processor-executable instructions that, when executed by a processor of a dynamic gas blending (DGB) system, cause the processor to perform certain operations for adjusting primary fuel when blending of primary fuel and secondary fuel is disabled. The operations include disabling, at a blend disabling angle, blending of primary fuel and secondary fuel for the DGB system; determining whether the secondary fuel has been injected for a current cycle for a cylinder prior to the blend disabling angle; in response to determining that the secondary fuel has been injected for the current cycle prior to the blend disabling angle, injecting a pilot shot of the primary fuel for the current cycle; and in response to determining that the secondary fuel has not been injected for the current cycle prior to the blend disabling angle, injecting a full shot of the primary fuel for the current cycle. Disabling the blending of the primary fuel and the secondary fuel includes disabling injection of the secondary fuel and disabling the blending of the primary fuel and the secondary fuel in response to detecting a command for disabling the blending. For an engine with a plurality of cylinders having a firing order, the operations additionally include, based at least in part of the firing order: determining whether the secondary fuel has been injected for a respective current cycle prior to the blend disabling angle; injecting the pilot shot of the primary fuel for the respective current cycle in response to determining that the secondary fuel has been injected for the respective current cycle prior to the blend disabling angle; and injecting a full shot of the primary fuel for the respective current cycle in response to determining that the secondary fuel has not been injected for the respective current cycle prior to the blend disabling angle.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Both the foregoing general description and the following detailed description are exemplary and explanatory only and are not restrictive of the features, as claimed. As used herein, the terms “comprises,” “comprising,” “has,” “having,” “includes,” “including,” or other variations thereof, are intended to cover a non-exclusive inclusion such that a process, method, article, or apparatus that comprises a list of elements does not include only those elements, but may include other elements not expressly listed or inherent to such a process, method, article, or apparatus. For the purpose of this disclosure, the term “ground surface” is broadly used to refer to all types of surfaces or materials that may be worked in material moving procedures (e.g., gravel, clay, sand, dirt, etc.) and/or can be cut, spread, sculpted, smoothed, leveled, graded, or otherwise treated. In this disclosure, unless stated otherwise, relative terms, such as, for example, “about,” “substantially,” and “approximately” are used to indicate a possible variation of ±10% in the stated value.

Figure 1:
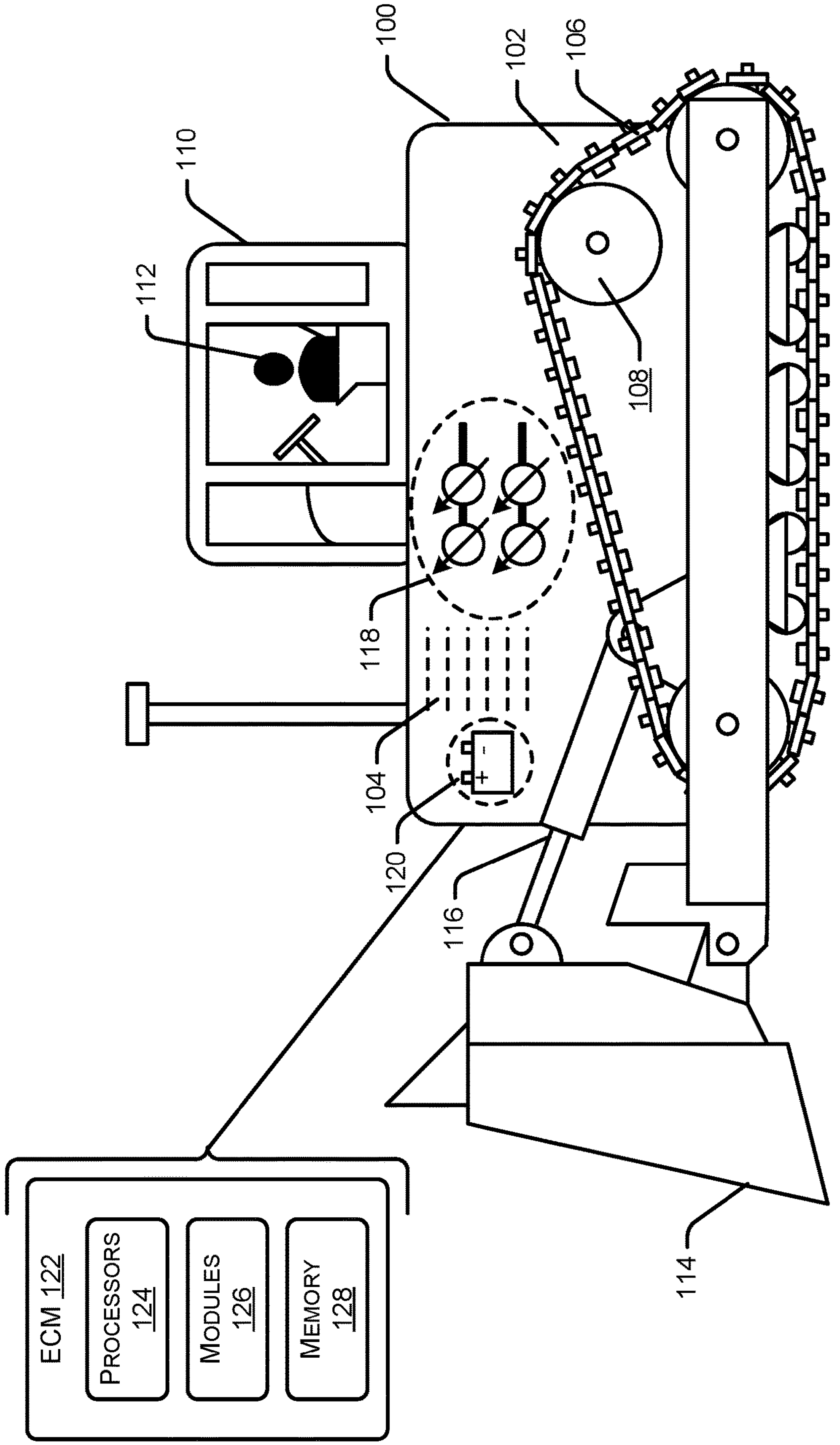
FIG. 1 is a schematic side view of an example machine with tracks for a propulsion system driven by an internal combustion engine (ICE).

FIG. 1 is a schematic side view of an example machine 100 with tracks for a propulsion system driven by an internal combustion engine (ICE). The example machine 100 shown in FIG. 1 is a bulldozer. However, the machine 100 may be any type of work machine configured to travel across and perform operations on terrain, such as such as an agricultural vehicle, and work vehicles, such as a track loader, a track excavator, a paver, a drill rig, and/or any other machine known to a person skilled in the art. Additionally, the machine 100 may also include any type of stationary work machine, such as a generator, a drill, a pump, and/or any other stationary work machine known to a person skilled in the art.

The machine 100 includes a chassis or frame 102 to which an internal combustion engine, or “engine,” 104 as a prime mover is attached. The engine 104 is configured to supply power for operation of the machine 100, including, for example, operating work implements, electronics, and steering, and/or for supplying torque to drive members to propel the machine 100 across the terrain. For example, the machine 100 shown in FIG. 1 includes a propulsion system, such as a pair of tracks 106 (only one set of tracks shown), that are configured to propel the machine 100 across pavement, gravel, dirt, or other work surfaces. The track 106 is driven by a final drive 108.

Although the machine 100 includes the tracks 106, it is contemplated that the machine 100 may include one or more wheels in addition to the tracks 106. The machine 100 also includes a cab 110 operationally connected to the frame 102 for protecting and/or providing comfort for an operator 112 of the machine 100, and/or for protecting control-related devices of the machine 100. In some examples, the machine 100 may be semi-autonomous or fully autonomous, and able to operate without an onboard or remote operator, and may not include the cab 110. In examples where the machine 100 is semi-autonomous or fully-autonomous, the machine 100 is prevented from, or avoids, accidentally colliding with or maneuvering undesirably close to other machines, personnel, and/or objects.

In the example shown in FIG. 1, the machine 100 also includes a work implement 114 for performing operations associated with the machine 100, such as digging, carrying, raising, and/or depositing material. Although the work implement 114 in FIG. 1 is illustrated as a shovel, other forms of work implements are contemplated. For example, the work implement 114 may include augers, brushcutters, brooms, grapples, hammers, pulverizers, rippers, rotors, buckets, and so forth. The machine 100 includes a work implement actuator 116 coupled at one end to the frame 102 and/or to the proximal end of the work implement 114. The work implement actuator 116 may be hydraulic cylinders powered by one or more hydraulic pumps 118. The work implement actuator 116 may also be electric motors or pneumatic cylinders. The work implement actuator 116 is configured to extend and retract, thereby pivoting the work implement 114 between an upright orientation and an at least partially inverted orientation, for example. In the upright orientation, the work implement 114 may hold material and in the at least partially inverted orientation, the work implement 114 may deposit or dump the material.

The machine 100 may include a battery 120 to power various electrical equipment in the machine 100 including an electronic control module (ECM) 122. The ECM 122 houses one or more processors 124, which may execute any modules, components, or systems associated with the machine 100, some of which may be housed in the ECM 122 as shown as modules 126. In some examples, the processors 124 may include a central processing unit (CPU), a graphics processing unit (GPU), both CPU and GPU, or other processing units or components known in the art. Additionally, each of the processors 124 may possess its own local memory, which also may store program modules, program data, and/or one or more operating systems.

Computer-readable media, such as memory 128, associated with the machine 100 may include volatile memory (e.g., RAM), non-volatile memory (e.g., ROM, flash memory, miniature hard drive, memory card, or the like), or some combination thereof. The computer-readable media may be non-transitory computer-readable media. The computer-readable media may include or be associated with the one or more of the above-noted modules, which perform various operations associated with the machine 100. In some examples, one or more of the modules may include or be associated with computer-executable instructions that are stored by the computer-readable media and that are executable by one or more processors to perform such operations.

Figure 2:
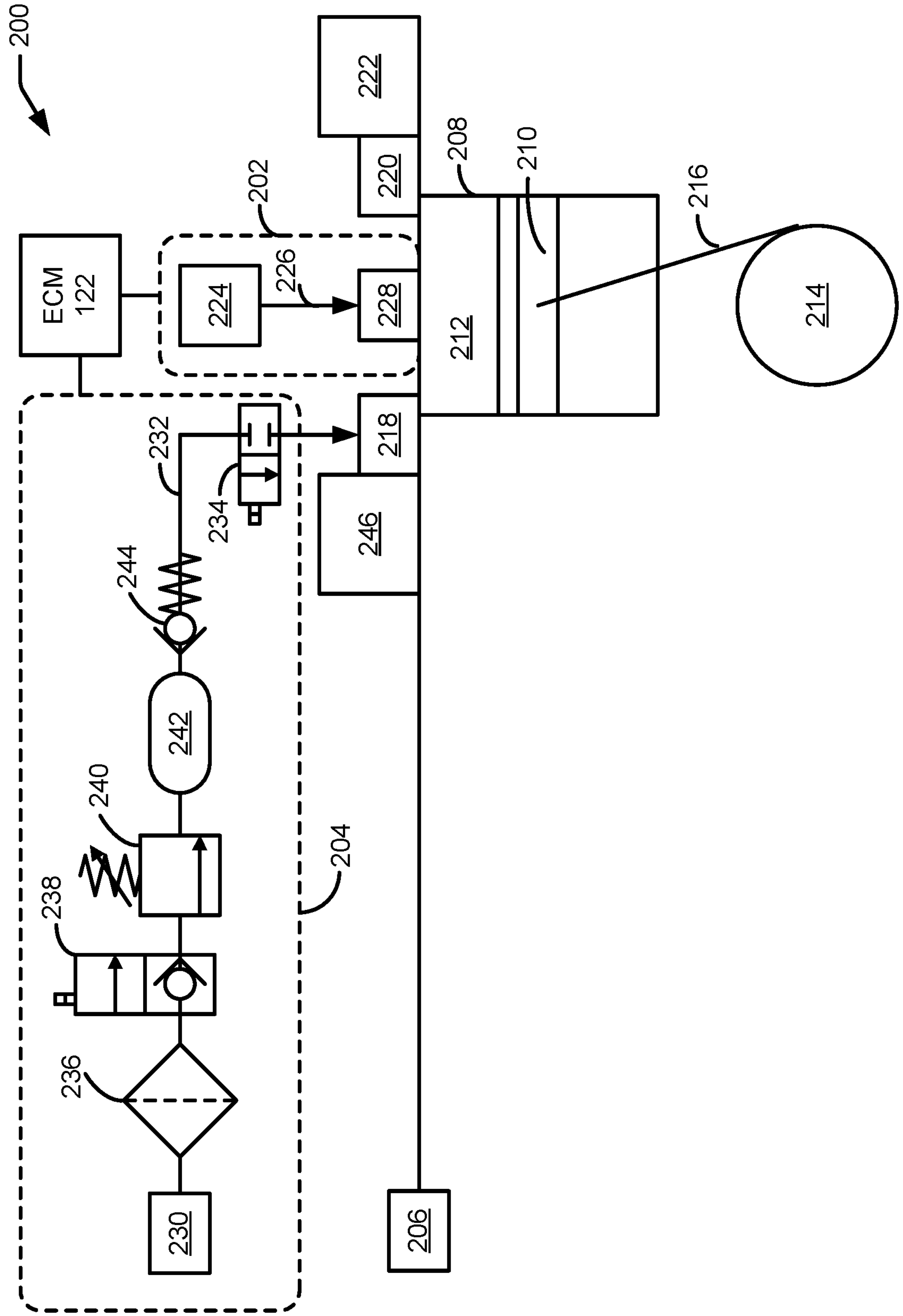
FIG. 2 is a schematic view of a dynamic gas blending (DGB) system having a primary fuel supply system and a secondary fuel supply system.

FIG. 2 illustrates a schematic view of a dynamic gas blending (DGB) system 200 having a primary fuel delivery system and a secondary fuel delivery system. The DGB system 200 may operate with an internal combustion engine capable of operating on two fuels. For example, the DGB system 200 may employ liquid fuel and/or gaseous fuel, or a combination of both liquid fuel and gaseous fuel. While diesel fuel is used in the exemplary embodiment, it is understood that any type of liquid fuel may be used, such as gasoline, methanol, ethanol, or any other type of liquid fuel. Further, as used herein, "gaseous fuel" may include fuel that is supplied to the DGB system 200 in gaseous form. Gaseous fuel may include, for example, natural gas, propane, bio-gas, landfill gas, carbon monoxide, hydrogen, or mixtures thereof. It is understood that DGB system 200 may employ only a single fuel at one time (liquid or gaseous fuel), or may employ both the liquid fuel and the gaseous fuel in unison.

As shown in FIG. 2, the DGB system 200 includes a diesel fuel delivery system 202 as the primary fuel delivery system and a gaseous fuel delivery system 204 as the secondary fuel supply system. The diesel fuel delivery system 202 and the gaseous fuel delivery system 204 are coupled to the ECM 122, which may monitor and control operation of the diesel fuel delivery system 202 and the gaseous fuel delivery system 204. The DGB system 200 may also include an air intake system 206 and a plurality of engine cylinders (a single example engine cylinder 208 is depicted in FIG. 2) of the engine 104. The diesel fuel delivery system 202 may deliver diesel fuel to the cylinder 208, the gaseous fuel delivery system 204 may deliver gaseous fuel to the cylinder 208, and the air intake system 206 may deliver intake air to the cylinder 208. The engine cylinder 208 may include a piston 210 slidably and reciprocally disposed to form a combustion chamber 212 of the cylinder 208. The piston 210 of each cylinder 208 may be connected to a crankshaft 214 via a connecting rod 216 and may provide power to a flywheel (not shown) of the engine 104. The cylinder 208 may also include an intake port 218 for providing an air (e.g., intake air) and fuel (e.g., gaseous fuel) mixture to the combustion chamber 212. The cylinder 208 may also include an exhaust port 220 for exhausting combustion gases from the cylinder 208 to an exhaust system 222.

The diesel fuel delivery system 202 may include a diesel fuel supply 224, such as a diesel fuel tank, fuel pump, fuel rail, and a diesel fuel supply line 226 for supplying diesel fuel from the diesel fuel supply 224 to each of the plurality of cylinder 208. For example, diesel fuel may be supplied to the cylinder 208 via a diesel fuel injector 228. It is understood that the diesel fuel delivery system 202 may include any number and/or combination of valves or other components known in the art.

The gaseous fuel delivery system 204 may include a gaseous fuel supply 230, such as a gas tank, and a gaseous fuel supply line 232 for supplying the gaseous fuel from the gaseous fuel supply 230 to the cylinder 208. For example, the gaseous fuel may be supplied to the cylinder 108 via a gaseous fuel injector 234, such as a solenoid operated gas admission valve (GAV), through the air intake system 206. Accordingly, the gaseous fuel may flow from the gaseous fuel supply 230 through the gaseous fuel supply line 232 and into the air intake system 206. The gaseous fuel delivery system 204 may also include a filter 236, a gas shut off valve (GSOV) 238, a regulator 240, a gaseous fuel rail 242, and a check valve 244.

The filter 236 may remove suspended liquids, dirt, and/or other particulates from the gaseous fuel to prevent the suspended liquids, dirt, and/or other particulates from clogging or damaging components of the gaseous fuel delivery system 204. The GSOV 238 may be disposed in the gaseous fuel supply line 232 downstream of the gaseous fuel supply 230. The GSOV 238 may include a closed state (shown in FIG. 2) and an open state. In the closed state, the GSOV 238 may prevent flow of the gaseous fuel from of the gaseous fuel supply 230 into the gaseous fuel supply line 232. The GSOV 238 may include a check valve, or the like, for preventing flow from the of the gaseous fuel supply 230 towards each of the plurality of cylinders 208 when the GSOV 238 is in the closed state, while allowing high pressure flow in the opposite, reverse direction (e.g., if the pressure in the gaseous fuel supply line 232 is greater than the pressure of the of the gaseous fuel supply 230). In the open state, the GSOV 238 may enable flow of gaseous fuel from the of the gaseous fuel supply 230 into the gaseous fuel supply line 232. The regulator 240 may include a valve for reducing and regulating a pressure of the gaseous fuel exiting of the gaseous fuel supply 230 and lowering the pressure to a predetermined level. The gaseous fuel rail 242 may distribute the gaseous fuel at a predetermined pressure to the gaseous fuel injectors 234 (only one injector is shown in FIG. 2). It is understood that the GSOV 238, the regulator 240, and the gaseous fuel injector 234 may include any type of valves known in the art.

The air intake system 206 may include an air intake manifold 246 and may supply intake air to the cylinder 208. In some embodiments, the gaseous fuel supply line 232 may be connected to the air intake manifold 246 (e.g., via the gaseous fuel injector 234) for providing the gaseous fuel to the air intake manifold 246. Accordingly, the air intake manifold 246 may supply a gaseous fuel and air mixture to the cylinder 208 (e.g., via the intake port 218).

Figure 3:
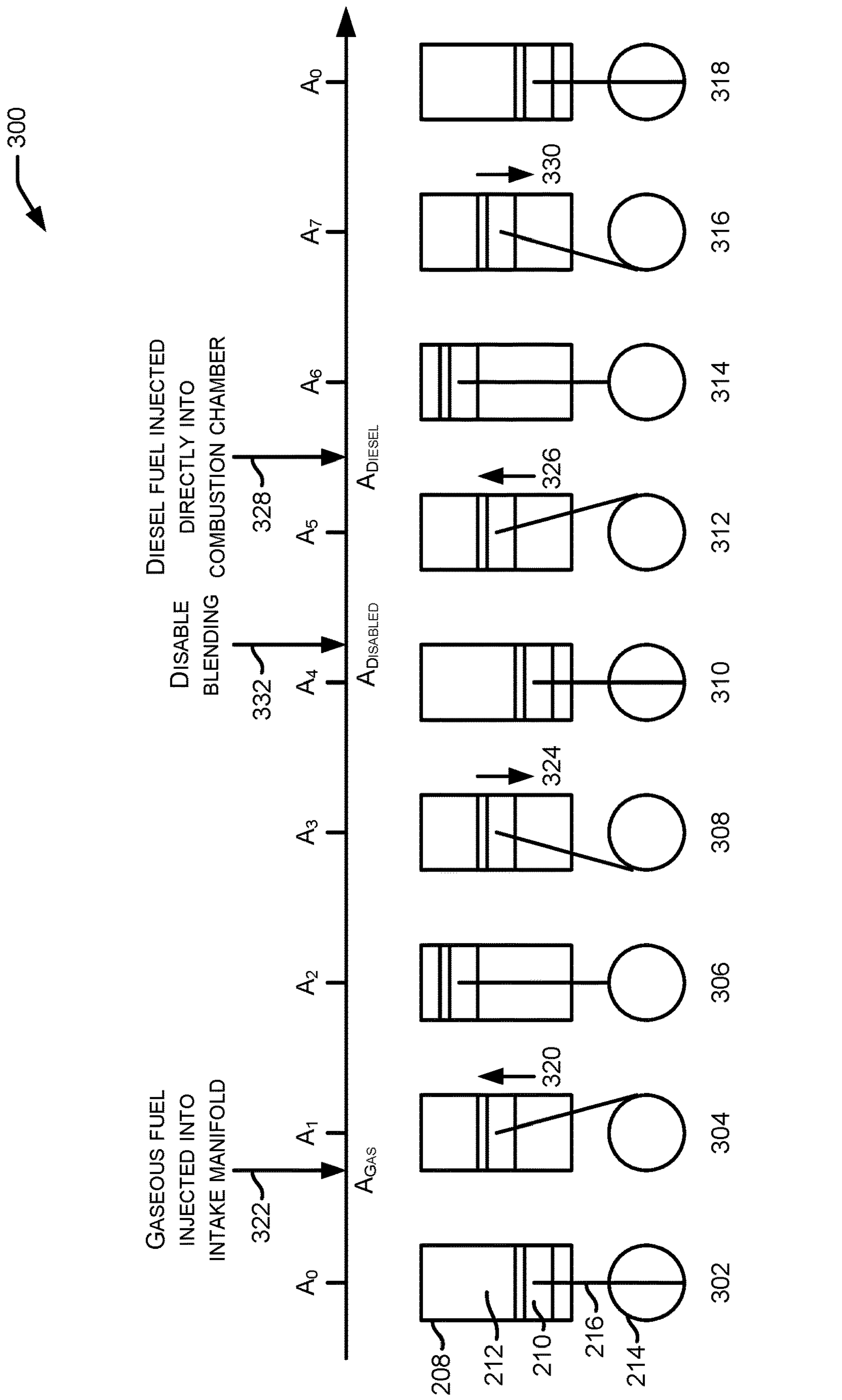
FIG. 3 is a schematic view of a cylinder over a cycle with fuel blending disable at a particular angle.

FIG. 3 is a schematic view 300 of a cylinder 208 over a cycle with fuel blending disabled at a particular angle. In this disclosure, disablement of fuel blending indicates and includes a complete disablement of fuel blending such as changing a ratio of secondary fuel and primary fuel from 85%: 15% to 0%: 100%. In addition, a partial disablement of fuel blending would be significant enough to cause high indicated mean effective pressure (IMEP) due to over-fueling or low IMEP due to under-fueling. These conditions are typically caused by a large change in the ratio of secondary fuel to primary fuel, for example, from 85%: 15% to 20%: 80%, where at least one of the primary fuel supply system, such as the diesel fuel delivery system 202, or the secondary fuel supply system, such as the gaseous fuel delivery system 204, is unable to react within a desired time period from the initiation of the change. Such disablement of fuel blending may take place in a short period of time, such as a period less than one combustion cycle.

Because the combustion cycle spans two revolutions of the crankshaft 214, i.e., 720°, angles of the crankshaft, or crankshaft angles, may be represented from −360° to 360° to emphasize that, for example, −270° is different from 90° in context of this disclosure. Configurations of the cylinder 208 with the piston 210 at various crankshaft angles are represented as 302, 304, 306, 308, 310, 312, 314, 316, and 318. In this example, a combustion cycle begins at a crankshaft angle $A_0$, where the piston 210, shown at 302, at the bottom dead center (BDC) of an exhaust stroke having the intake port 218 closed and the exhaust port 220 beginning to open as described above with referenced to FIG. 2. As shown at 304 with an arrow 320, the piston 210 moves upwards and exhausts spent gas in the combustion chamber 212 via the exhaust port 220 over crankshaft angles $A_1$ to $A_2$, where the piston 210, shown at 306, reaches the top dead center (TDC) and begins an intake stroke. Between the crankshaft angles $A_0$ and $A_2$, the gaseous fuel may be injected via the gaseous fuel injector 234 into the air intake manifold 246 at a gaseous fuel injection angle, $A_{GAS}$, of the crankshaft 214, as shown with an arrow 322.

As an intake stroke begins at the crankshaft angle $A_2$, the exhaust port 220 is closed and the intake port 218 begins to open. As shown at 308 with an arrow 324, the piston 210 moves downwards and draws the gaseous fuel into the combustion chamber 212 via the intake port 218 over crankshaft angles $A_3$ to $A_4$, where the piston 210, shown at 310, reaches the BDC and begins a compression stroke with the intake port 218 closed. As shown at 312 with an arrow 326, the piston 210 moves upwards and compresses the gaseous fuel in the combustion chamber 212 over crank angles $A_5$ to $A_6$, where the piston 210, shown at 314, reaches the TDC. Between crankshaft angles $A_4$ and $A_6$, diesel fuel may be injected via the diesel fuel injector 228 directly into the combustion chamber 212 at a diesel fuel injection angle, $A_{DIESEL}$, the crankshaft 214, as shown with an arrow 328. Because, in this example, energy is also partially provided by the gaseous fuel, a pilot shot of diesel fuel is injected at the $A_{DIESEL}$, where the pilot shot is an amount of diesel fuel that, with the injected gaseous fuel, provides a proper amount of total fuel for this cycle. At the crankshaft angle $A_6$, a mixture of gaseous fuel and diesel fuel in the combustion chamber 212 may be ignited to start a power stroke. As the mixture is ignited and expands in the combustion chamber, the piston 210 moves downwards, as shown at 316 with an arrow 330, over crankshaft angles $A_7$ to $A_0$ and transfers power to the flywheel of the engine 104. The piston 210 at the crankshaft angle $A_0$, shown at 318, is equivalent to the piston 210 at the crankshaft angle $A_0$, shown at 302, and the combustion cycle repeats the process described above.

When the fuel mixture change is initiated, for example, disabling blending and operating on diesel fuel alone, the diesel fuel delivery system 202 is able to react to the fuel mixture change faster than the gaseous fuel delivery system 204. For example, if the blending were disabled, i.e., to run the engine 104 on diesel fuel only, at a blend disabling angle, $A_{DISABLED}$, of the crankshaft 214, as shown with an arrow 332, between the $A_{GAS}$ and $A_{DIESEL}$, the diesel fuel delivery system 202 would be able to react to the change and be able to provide a full shot of diesel fuel at the $A_{DIESEL}$, where the full shot of diesel fuel is an amount of diesel fuel alone for proper combustion. However, because the gaseous fuel is already injected into the air intake manifold 246 at the $A_{GAS}$, providing a full shot of diesel fuel for this cycle would result in over-fueling the cylinder 208.

Figure 4:
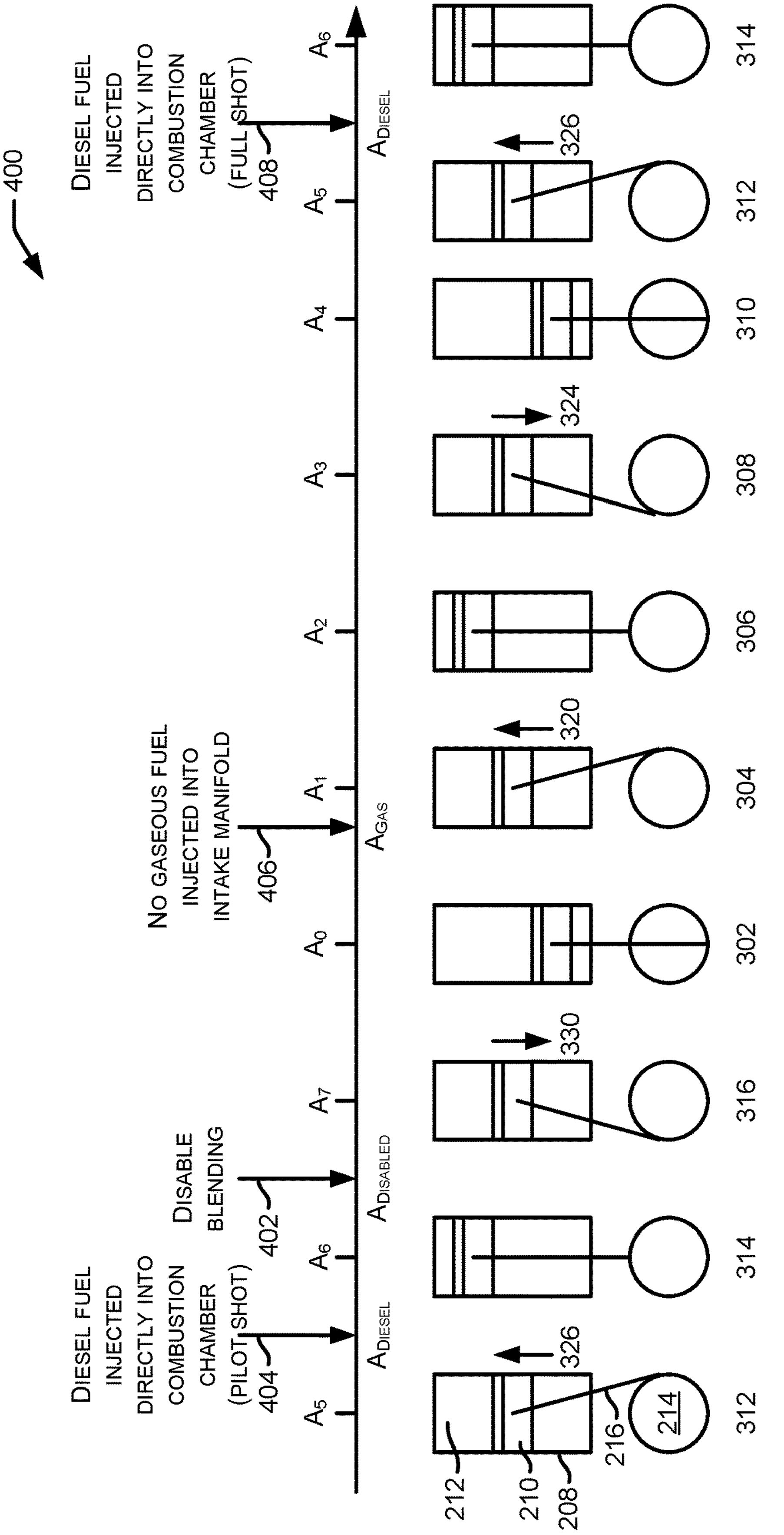
FIG. 4 is schematic view of a cylinder over a cycle with fuel blending disable at another angle.

FIG. 4 is schematic view 400 of the cylinder 208 over a cycle with fuel blending disable at another angle, $A_{DISABLED}$, between the crankshaft angles $A_6$ to $A_7$ as shown with an arrow 402. In this example, diesel fuel injected at $A_{DIESEL}$, as shown with an arrow 404, occurs prior to the blending disablement at the $A_{DISABLED}$, i.e., the DGB system 200 is supplying both diesel fuel and gaseous fuel, the DGB operates the diesel fuel delivery system 202 to provide a pilot shot of diesel fuel at the $A_{DIESEL}$, at 404. Because, in this example, the $A_{DISABLED}$ 402 occurs prior to the gaseous fuel is scheduled to be injected at the $A_{GAS}$ as shown with an arrow 406, the DGB system 200 operates the gaseous fuel delivery system 204 not to inject gaseous fuel at the $A_{GAS}$, and operates the diesel fuel delivery system 202 to inject full shot of diesel fuel at the $A_{DIESEL}$ as shown with an arrow 408.

Figure 5:
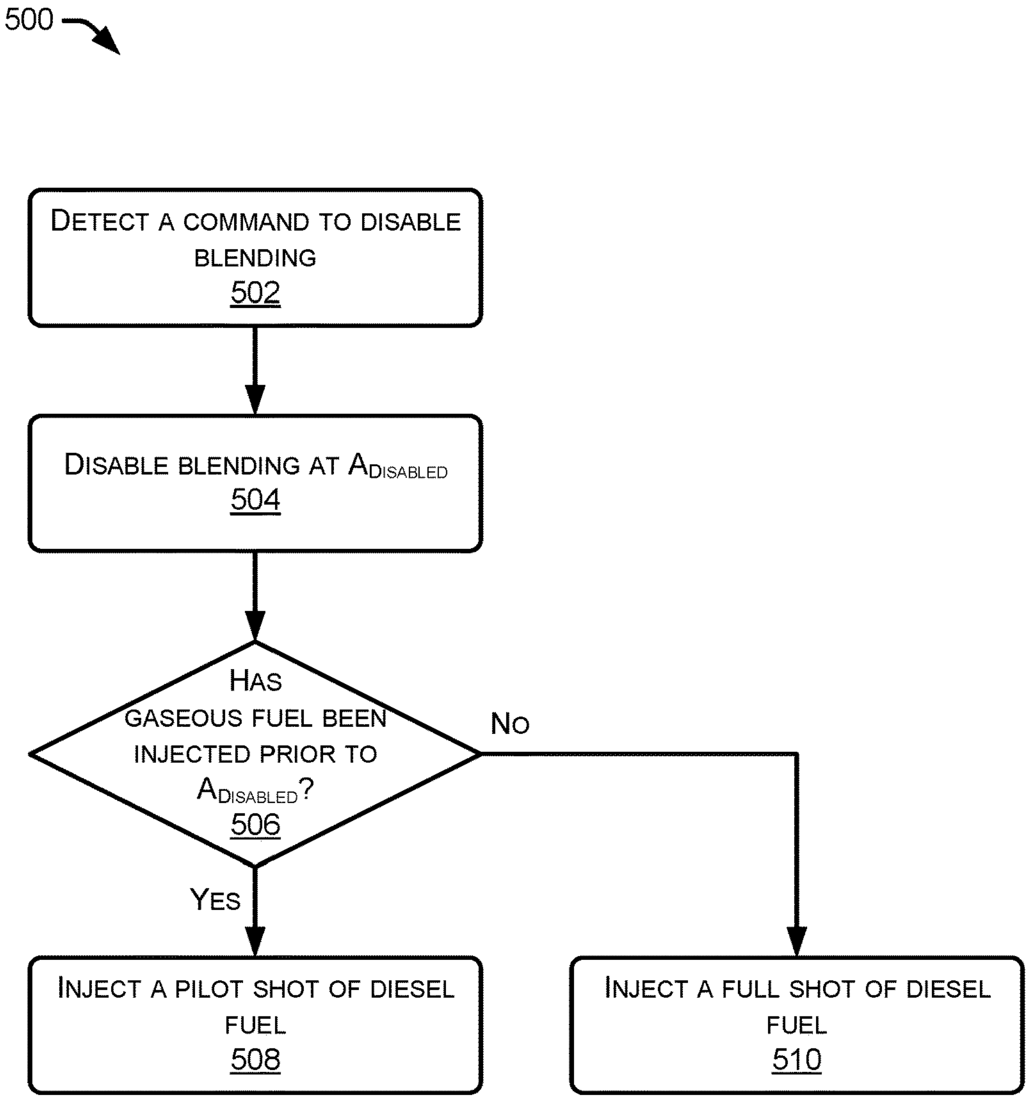
FIG. 5 is a flowchart illustrating a process of operating the DGB system based on blending disablement of the primary fuel and the secondary fuel.

FIG. 5 is a flowchart 500 illustrating a process of operating the DGB system 200 based on blending disablement of the primary fuel and the secondary fuel. The flowchart 500 is illustrated as a logical flow graph, with reference to FIGS. 3 and 4, operation of which represents a sequence of operations that can be implemented in hardware, software, or a combination thereof. In this example, the process is illustrated as implemented in the ECM 122. While in this example, the primary fuel, i.e., diesel fuel, is direct injected via the diesel fuel delivery system 202 and the secondary fuel, i.e., gaseous fuel, is port injected via the gaseous fuel delivery system 204, the method described below is also applicable if the primary fuel is port injected and the additional fuel is direct injected (with or without a spark).

To avoid over-fueling, the ECM 122 may monitor and operate the diesel fuel delivery system 202 and the gaseous fuel delivery system 204 based on the $A_{GAS}$ and $A_{DIESEL}$. For example, at block 502, the ECM 122 may detect, or receive, a command to disable blending of the primary fuel, such as diesel fuel, and the secondary fuel, such as gaseous fuel, at the $A_{DISABLED}$ and may disable the blending to operate solely on diesel fuel at block 504. At block 506, the ECM 122 may determine whether the gaseous fuel has been injected for a current cycle for a cylinder, such as the cylinder 208, prior to the $A_{DISABLED}$. In response to determining that the gaseous fuel has been injected prior to the $A_{DISABLED}$ ("YES" branch), the ECM 122 may operate the diesel fuel delivery system 202 to inject a pilot shot of diesel fuel at the $A_{DIESEL}$ at block 508. For example, with reference to FIG. 3, the blending of diesel fuel and gaseous fuel is shown to be disabled at $A_{DISABLED}$ after gaseous fuel has already been injected at the $A_{GAS}$. Therefore, the ECM 122, based on the sequence and timing of the $A_{GAS}$, $A_{DISABLED}$, and $A_{DIESEL}$, operates the diesel fuel delivery system 202 to inject a pilot shot of diesel fuel at the $A_{DIESEL}$. If, however, the ECM 122 determines that the gaseous fuel has not been injected to the cylinder 208 prior to the $A_{DISABLED}$ ("NO" branch), the ECM 122 may operate the diesel fuel delivery system 202 to inject a full shot of diesel fuel at the $A_{DIESEL}$ at block 510.

The cylinder 208 may be a first cylinder of a plurality of cylinders of an engine, where the plurality of cylinders have a specific firing order. Because in a multi-cylinder engine, firing and fuel injection, is staggered, each cylinder may be at a different stage of combustion cycle when the blending is disabled. Therefore, the ECM 122 may determine whether the gaseous fuel has been injected for a current cycle for each cylinder of the engine prior to the $A_{DISABLED}$ at block 506 at least in part on the firing order of the plurality of cylinders. Depending on the results for each cylinder at block 506, one or more cylinders may receive pilot shots of diesel fuel while other cylinders may receive full shots of diesel fuel.

Figure 6:
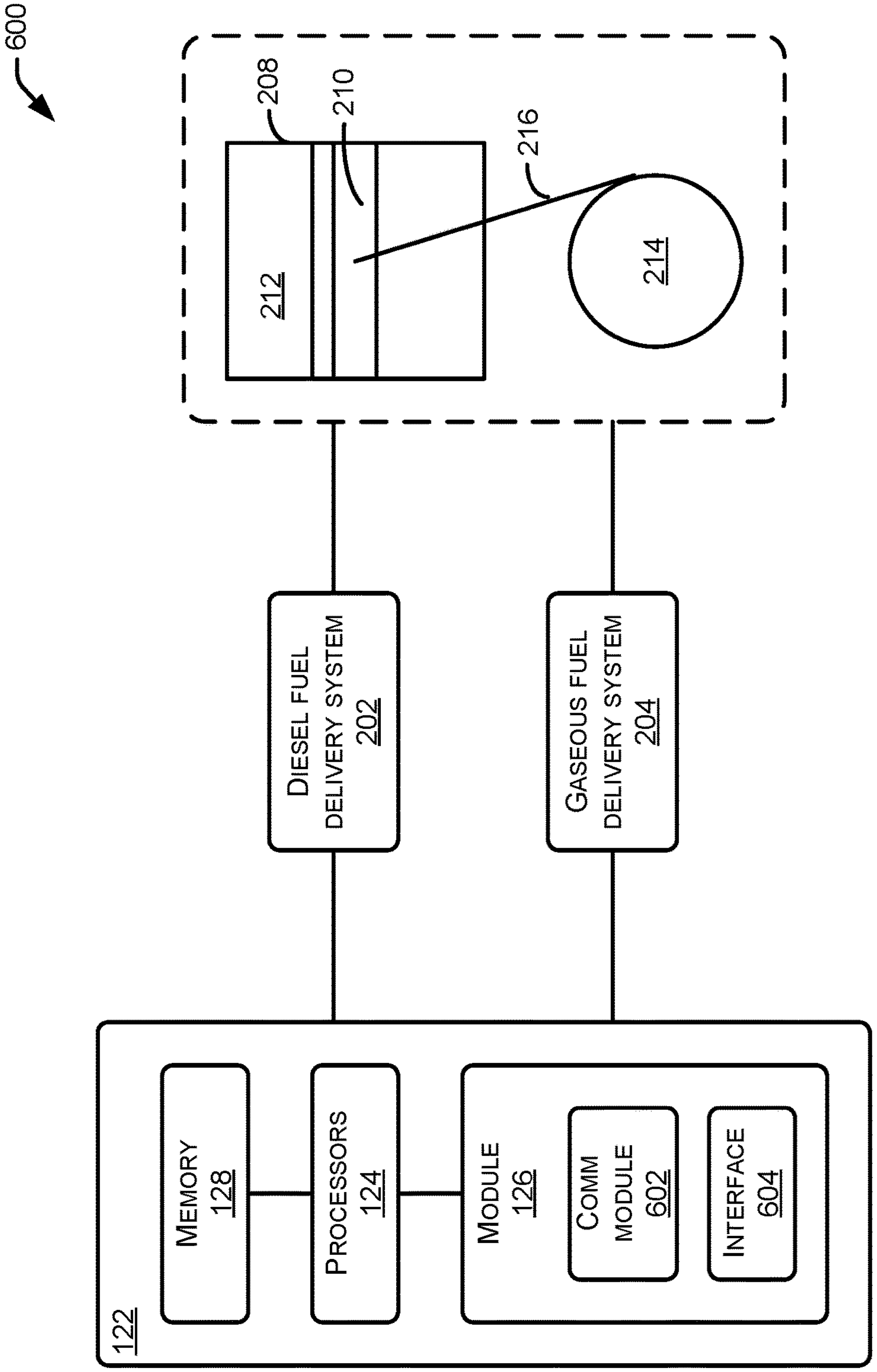
FIG. 6 is a block diagram of the DGB system coupled to a cylinder.

FIG. 6 is a block diagram 600 of the DGB system 200 coupled to the cylinder 208. For the purpose of discussion, unless otherwise specified, FIG. 5 will be described below with respect to the processors 124 of the ECM 122 performing the method and steps described above with reference to FIGS. 2-5. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the process. The ECM 122 may also embody single or multiple microprocessors, field programmable gate arrays (FPGAs), digital signal processors (DSPs), programmable logic controllers (PLCs), etc.

The ECM 122 may also be hosted by a single server or distributedly hosted by a plurality of servers in a cloud environment. The ECM 122 may comprise the processors 124, a memory 128 communicatively coupled to the processors 124, and the modules 126 communicatively coupled to the processors 124. The modules 126 may include a communication module 602 and an interface 604, such as a user interface and input/output (I/O) module capable of receiving inputs and providing outputs. The inputs and outputs may be communicated to and from the communication module 602 via a communication network (not shown), which may be a cellular network, Wi-Fi® network, or any other type of network.

In some examples, the processors 124 may include a central processing unit (CPU), a graphics processing unit (GPU), both CPU and GPU, or other processing units or components known in the art. Additionally, the processors 124 may possess its own local memory, which also may store program modules, program data, and/or one or more operating systems. The memory 128 may comprise computer-readable media, which may include volatile memory (e.g., RAM), non-volatile memory (e.g., ROM, flash memory, miniature hard drive, memory card, or the like), or some combination thereof. The computer-readable media may be non-transitory computer-readable media. The computer-readable media may include or be associated with the one or more of the above-noted modules, which perform various operations associated with the ECM 122. In some examples, one or more of the modules may include, or be associated with, computer-executable instructions that are stored by the computer-readable media and that are executable by one or more processors to perform such operations. For example, the memory 128 may store processor-executable instructions that, when executed by the processors 124 of the ECM 122, cause the processors 124 to perform operations for monitoring and operating the DGB system 200 as described above with reference to FIGS. 2-5.

The software and or functionality of the system(s), component(s), algorithms, cloud(s), platform(s), etc., discussed above with reference to FIGS. 2-5 regarding operating the DGB system 200 depending on design requirements, case of construction and/or integration, cost, etc. Accordingly, while these elements have been separated for purposes of discussion, they may be combined, as appropriate, during implementation.

The ECM 122 may be configured to use artificial intelligence for maintaining synchronization between centralized (cloud-based) and distributed models. The ECM 122 may include a centralized or cloud-based computer processing system located in one or more of a back-office server or a plurality of remote servers, one or more distributed, edge-based computer processing systems separately located with each of the distributed computer processing systems communicatively connected to the centralized computer processing system.

A machine learning engine may be included in at least one of the centralized and distributed computer processing systems, such as the ECM 122. The machine learning engine may train a learning system using the training data to enable the machine learning engine to safely mitigate a divergence discovered between first and second sets of output control commands using a learning function including at least one learning parameter. Training the learning system may include providing the training data as an input to the learning function. The learning function may be configured to use the at least one learning parameter to generate an output based on the input, cause the learning function to generate the output based on the input, and compare the output to one or more of the first and second sets of output control commands to determine a difference between the output and the one or more of the first and second sets of output control commands. The learning function may modify the at least one learning parameter and the output of the learning function to decrease the difference responsive to the difference being greater than a threshold difference and under a variety of different conditions.

INDUSTRIAL APPLICABILITY

The example systems and methods of the present disclosure are applicable for adjusting primary fuel when blending of primary fuel and secondary fuel is disabled for duel fuel engines to prevent over-fueling and under-fueling of cylinders.

In a port injected dual fuel system, such as a dynamic gas blending (DGB) system, diesel injectors of the diesel fuel supply system, which inject diesel fuel directly into a combustion chamber of a cylinder, have a shorter reload angle than corresponding gas admission valves of the natural gas supply system, which inject natural gas into an intake port. If the DGB is disabled and the diesel injectors are switched to fueling full diesel shots, some cylinders, having already loaded with natural gas outside the intake valves, may be over-fueled. If the DGB is disabled and the diesel injectors are delayed switching to fueling full diesel shots, some cylinders may then be under-fueled. The method to prevent the over-fueling and under-fueling of the cylinders includes, for example, disabling, at a blend disabling angle, blending of primary fuel and secondary fuel for the DGB; determining whether the secondary fuel has been injected for a current cycle for a cylinder prior to the blend disabling angle; in response to determining that the secondary fuel has been injected for the current cycle prior to the blend disabling angle, injecting a pilot shot of the primary fuel for the current cycle; and in response to determining that the secondary fuel has not been injected for the current cycle prior to the blend disabling angle, injecting a full shot of the primary fuel for the current cycle. Disabling the blending of the primary fuel and the secondary fuel includes disabling injection of the secondary fuel and disabling the blending of the primary fuel and the secondary fuel in response to detecting a command for disabling the blending. Where the cylinder is a first cylinder of a plurality of cylinders of an engine having a firing order, the method additionally includes, for each cylinder of the plurality of cylinders, determining whether the secondary fuel has been injected for a respective current cycle prior to the blend disabling angle; in response to determining that the secondary fuel has been injected for the respective current cycle prior to the blend disabling angle, injecting the pilot shot of the primary fuel for the respective current cycle; and in response to determining that the secondary fuel has not been injected for the respective current cycle prior to the blend disabling angle, injecting a full shot of the primary fuel for the respective current cycle.

Unless explicitly excluded, the use of the singular to describe a component, structure, or operation does not exclude the use of plural such components, structures, or operations or their equivalents. The use of the terms “a” and “an” and “the” and “at least one” or the term “one or more,” and similar referents in the context of describing the invention (especially in the context of the following claims) are to be construed to cover both the singular and the plural, unless otherwise indicated herein or clearly contradicted by context. The use of the term “at least one” followed by a list of one or more items (for example, “at least one of A and B” or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word “or” refers to any possible permutation of a set of items. For example, the phrase “A, B, or C” refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the examples above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof.

What is claimed is:

1. A method in a dynamic gas blending (DGB) system comprising:
- generating a command, at a blend disabling angle, to disable blending of a primary fuel and a secondary fuel for the DGB system;
- determining whether the secondary fuel has been injected for a current cycle for a cylinder prior to the blend disabling angle; and
- in response to determining that the secondary fuel has been injected for the current cycle prior to the blend disabling angle, injecting a pilot shot of the primary fuel for the current cycle; and
- wherein disabling the blending of the primary fuel and the secondary fuel includes disabling injection of the secondary fuel.

2. The method of claim 1, further comprising:
- in response to determining that the secondary fuel has not been injected for the current cycle prior to the blend disabling angle, injecting a full shot of the primary fuel for the current cycle.

3. The method of claim 1, wherein disabling the blending of the primary fuel and the secondary fuel includes disabling the blending of the primary fuel and the secondary fuel in response to detecting a command for disabling the blending.

4. The method of claim 1, wherein:
- the primary fuel is diesel fuel, and
- the secondary fuel is gaseous fuel.

5. The method of claim 1, wherein the cylinder is a first cylinder of a plurality of cylinders of an engine.

6. The method of claim 5, wherein the plurality of cylinders has a firing order, and
- the method further comprising, for each cylinder of the plurality of cylinders:
- determining whether the secondary fuel has been injected for a respective current cycle prior to the blend disabling angle; and
- in response to determining that the secondary fuel has been injected for the respective current cycle prior to the blend disabling angle, injecting the pilot shot of the primary fuel for the respective current cycle.

7. The method of claim 6, further comprising:
- in response to determining that the secondary fuel has not been injected for the respective current cycle prior to the blend disabling angle, injecting a full shot of the primary fuel for the respective current cycle.

8. A dynamic gas blending (DGB) system comprising:
- an electronic control module (ECM);
- a primary fuel delivery system coupled to the ECM and a cylinder, the primary fuel delivery system configured to deliver primary fuel; and a secondary fuel delivery system coupled to the ECM and the cylinder, the secondary fuel delivery system configured to secondary primary fuel, wherein the ECM comprises:

a processor; and a memory communicatively coupled to the processor, the memory storing thereon processor-executable instructions that, when executed by the processor, cause the processor to:

disable, at a blend disabling angle, blending of the primary fuel and the secondary fuel for the DGB, including disabling injection of the secondary fuel to disable the blending of the primary fuel and the secondary fuel;

determine whether the secondary fuel has been injected for a current cycle for the cylinder prior to the blend disabling angle; and inject a pilot shot of the primary fuel for the current cycle in response to determining that the secondary fuel has been injected for the current cycle prior to the blend disabling angle.

9. The DGB system of claim 8, wherein the processor-executable instructions further cause the processor to:

inject a full shot of the primary fuel for the current cycle in response to determining that the secondary fuel has not been injected for the current cycle prior to the blend disabling angle.

10. The DGB system of claim 8, wherein the processor-executable instructions further cause the processor to:

detect a command for disabling the blending; and disable the blending in response to detecting the command.

11. The DGB system of claim 8, wherein:

the cylinder is a first cylinder of a plurality of cylinders of an engine having a firing order, and the processor-executable instructions further cause the processor to, based at least in part of the firing order:

determine whether the secondary fuel has been injected for a respective current cycle prior to the blend disabling angle; and inject the pilot shot of the primary fuel for the respective current cycle in response to determining that the secondary fuel has been injected for the respective current cycle prior to the blend disabling angle.

12. The system of claim 11, wherein the processor-executable instructions further cause the processor to:

inject a full shot of the primary fuel for the respective current cycle in response to determining that the secondary fuel has not been injected for the respective current cycle prior to the blend disabling angle.

13. Non-transitory computer-readable medium storing thereon processor-executable instructions that, when executed by a processor of a dynamic gas blending (DGB) system, cause the processor to perform operations, the operations comprising:

disabling, at a blend disabling angle, blending of primary fuel and secondary fuel for the DGB system;

determining whether the secondary fuel has been injected for a current cycle for a cylinder prior to the blend disabling angle;

in response to determining that the secondary fuel has been injected for the current cycle prior to the blend disabling angle, injecting a pilot shot of the primary fuel for the current cycle; and in response to determining that the secondary fuel has not been injected for the current cycle prior to the blend disabling angle, injecting a full shot of the primary fuel for the current cycle; and wherein disabling the blending of the primary fuel and the secondary fuel includes disabling injection of the secondary fuel.

14. The non-transitory computer-readable medium of claim 13, wherein disabling the blending of the primary fuel and the secondary fuel includes:

detecting a command for disabling the blending; and disabling the blending of the primary fuel and the secondary fuel in response to detecting the command.

15. The non-transitory computer-readable medium of claim 13, wherein:

the cylinder is a first cylinder of a plurality of cylinders of an engine, the plurality of cylinders having a firing order, and the operations further comprise, for each cylinder of the plurality of cylinders:

determining whether the secondary fuel has been injected for a respective current cycle prior to the blend disabling angle based at least in part of the firing order.

16. The non-transitory computer-readable medium of claim 15, wherein the operations further comprise, for each cylinder of the plurality of cylinders:

in response to determining that the secondary fuel has been injected for the respective current cycle prior to the blend disabling angle, injecting the pilot shot of the primary fuel for the respective current cycle; and in response to determining that the secondary fuel has not been injected for the respective current cycle prior to the blend disabling angle, injecting the full shot of the primary fuel for the respective current cycle.

17. The non-transitory computer-readable medium of claim 13, wherein:

the primary fuel is diesel fuel, and the secondary fuel is gaseous fuel.

* * * * *